F. DUNDEE.
HOIST.
APPLICATION FILED APR. 22, 1920.
1,369,331.
Patented Feb. 22, 1921.
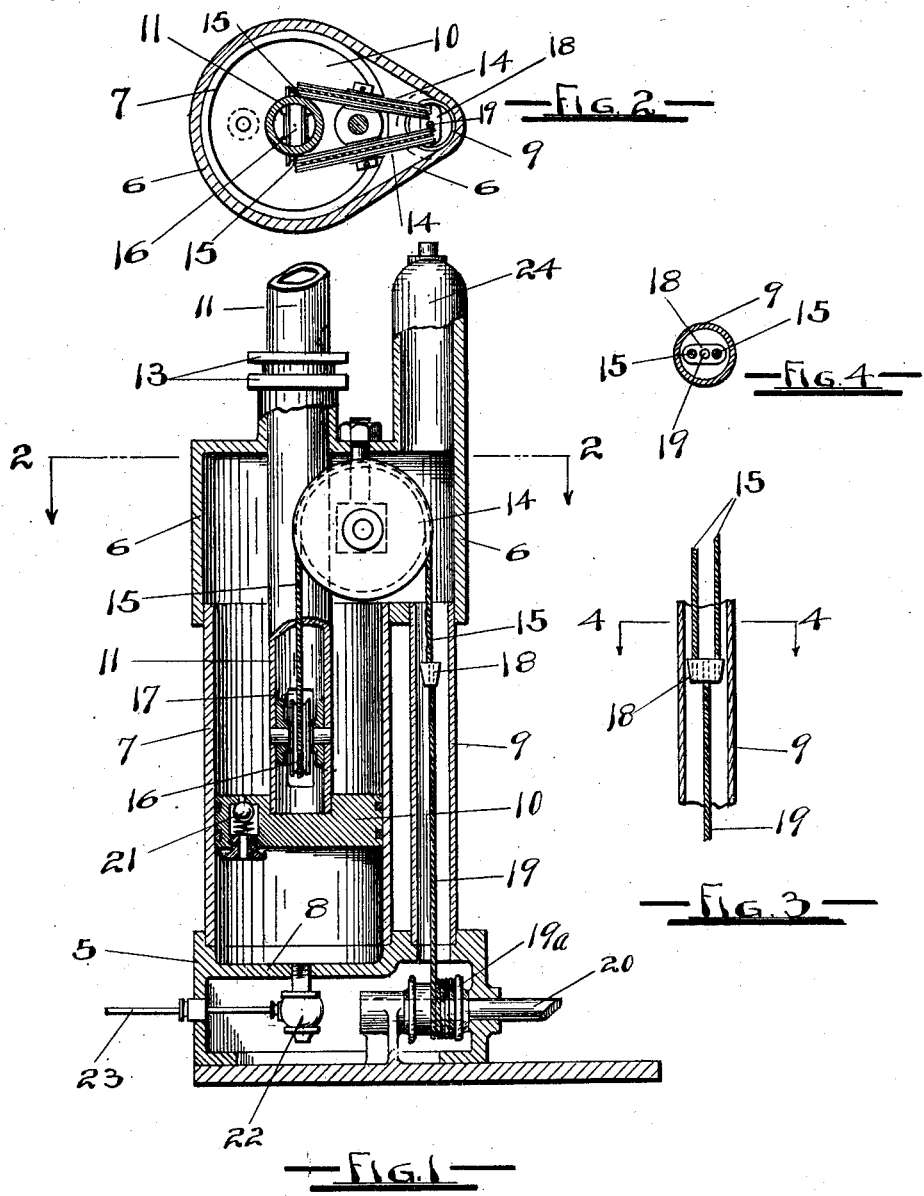

UNITED STATES PATENT OFFICE.

FRED DUNDEE, OF PORTLAND, OREGON.

HOIST.

1,369,331. Specification of Letters Patent. Patented Feb. 22, 1921.

Application filed April 22, 1920. Serial No. 375,893.

*To all whom it may concern:*

Be it known that I, FRED DUNDEE, a citizen of the United States, residing at Portland, county of Multnomah, State of Oregon, have invented certain new and useful Improvements in Hoists, of which the following is a specification.

My invention relates to hoists in general, the object being to provide a mechanically operated hoist having a hydraulic brake for the lowering thereof; to provide a mechanically operated hoist the mechanism of which is entirely inclosed within the structure of said hoist and continually lubricated in all of its parts by the liquid medium of said hydraulic brake to the lowering motion.

I accomplish the above objects, and other desirable results that will hereinafter appear, by means of the construction illustrated in the accompanying drawing, which is a part of this application for Letters Patent, like characters of reference indicating like parts throughout the several views thereof, and in which:

Figure 1 is a sectional elevation of my device.

Fig. 2 is a sectional plan upon line 2—2 of Fig. 1.

Fig. 3 is a fragmentary sectional elevation of the bypass pipe.

Fig. 4 is a sectional plan upon line 4—4 of Fig. 3.

In general my device consists of a hoist cylinder, piston and piston rod, block and tackle means within said cylinder for hoisting said piston and piston rod, a liquid completely filling the entire device, suitable check valves to allow said piston to rise within said liquid, and suitable bypass means to control the flow of said liquid as the piston lowers.

I provide my device with a base 5 and a cap 6 between which is mounted a cylinder 7, said cylinder being open into the cap 6 at the top of the cylinder and closed at the bottom thereof by a diaphragm 8 in said base 5.

Also connecting said base 5 and said cap 6 is a bypass pipe 9 open into both said base and said cap, and disposed substantially parallel to the cylinder 7. A piston 10 is slidably mounted within the cylinder 7, and a piston rod 11, preferably of hollow construction such as a pipe, is secured to said piston 10 and projects beyond the top of the cylinder 7 through a suitable stuffing box 13.

Within said cap 6 I mount a pair of sheaves 14 registering with diametrically opposite sides of the piston rod 11 and with the bypass pipe 9, as shown in Fig. 2, so that ropes or other flexible tension members 15 may be passed upward through said bypass pipe 9, over the respective sheaves 14, downward along the surface of the piston rod 11, around an equalizing device adjacent the lower end of the piston rod 11, upward along the surface of the piston rod 11 upon the opposite side thereof to the respective sheave 14 and thence downward into the bypass pipe 11, as shown in Fig. 1.

Any convenient equalizing device may be used adjacent the lower end of the piston rod 11, that illustrated being a sheave 16 journaled within the piston rod 11 and protruding upon each side thereof through slots 17 therein.

The two ends of the member 15 within the bypass pipe 9 are secured to a thimble 18, and a flexible tension member 19 is also secured to said thimble 18 and extends downward through said bypass pipe 9 to be wound upon a drum 19ª secured upon a shaft 20 journaled within the base 5, as shown in Fig. 1. By this means operation of the drum 19 will hoist the piston 10 and piston rod 11, but since the entire structure is filled with a liquid, means of passing said liquid around or through said piston 10 as the latter ascends must be provided, which I do by placing a check valve 21 in said piston 10.

When the piston and piston rod are lowered the check valve 21 closes and thereby entraps the liquid below the piston 10 within the cylinder 7, and thus the piston is held stationary until the valve 22 is opened by the operator by means of the valve rod 23, whereupon the liquid below the piston is enabled to pass through said valve 22 into the base 5, and therefrom by means of bypass pipe 9 to a point in the structure above the piston 10, thereby allowing the piston and piston rod to lower. It is obvious that the speed of lowering may be very accurately controlled by means of the valve 22, and when said valve is entirely closed it will be impossible to lower, so that the load upon the hoist may be safely sustained in raised position as long as said valve remains closed.

For the proper operation of this hoist it is necessary that the same should be completely filled with the liquid, and to insure this I provide a reservoir 24 upon the cap 6 extending above the same, which will insure that the device is always entirely filled with the liquid up to the top of said cap 6.

My device may be made of any size, and constructed of any materials deemed convenient and suitable for a device of this character, and while I have illustrated and described a form of construction and arrangement of parts found desirable in materializing my invention, I wish to include in this application for Letters Patent all mechanical equivalents and substitutes that may fairly be considered to come within the scope and purview of my invention as defined in the appended claims.

Having disclosed my invention so that others may be enabled to construct and to use the same, what I claim as new and desire to secure by Letters Patent is:

1. In a hoist, a piston, a cylinder and a piston rod, in combination with a block and tackle mechanism secured to said piston and disposed within said cylinder; and means to operate said block and tackle mechanism from outside said cylinder.

2. In a hoist, a cylinder, a piston and piston rod, in combination with a bypass connecting the upper and lower ends of said cylinder; a valve controlling said bypass; and hoisting mechanism within said cylinder.

3. In a hoist the combination of a block and tackle hoisting mechanism with hydraulic lowering mechanism comprising a valve controlled bypass pipe, said block and tackle being entirely inclosed within said hoist and operated by a flexible tension member passing through said bypass pipe.

4. In a hoist, a base; a cap; a cylinder mounted upon said base and communicating with said cap; a bypass pipe disposed between said base and said cap and communicating with each; a valve controlled means of communication between said base and said cylinder beneath a piston disposed within said cylinder; a check valve in said piston; a pair of sheaves mounted within said cap; an equalizer secured to said piston; a drum rotatably mounted within said base; and a flexible tension member operating upon said drum, said sheaves and said equalizer.

5. In a hoist, an inclosed base; a winding drum within said base; a cylinder mounted upon said base; a cap mounted upon said cylinder and opening thereinto; a bypass pipe forming a passageway between said cap and said base; a piston within said cylinder; sheaves mounted within said cap; an equalizer secured to said piston; a flexible tension member wound upon said drum and passing through said bypass pipe to said sheaves and thence to said equalizer; and valves to control the flow of liquid within said hoist.

6. A cylindrical direct acting piston hoist, having a block and tackle hoisting mechanism inclosed therein, and a hydraulic lowering mechanism comprising a valve controlled bypass and a check valve in the hoist piston.

In testimony whereof I claim the foregoing as my own I hereunto affix my signature in the presence of two witnesses, at Portland, county of Multnomah, State of Oregon, this 16th day of April, 1920.

FRED DUNDEE.

Witnesses:
C. F. BLAKE,
L. J. ROBINSON.